United States Patent [19]

Beijer

[11] Patent Number: 4,459,119
[45] Date of Patent: Jul. 10, 1984

[54] LOCK WASHER FOR SPRING TYPE RETAINER RINGS

[76] Inventor: Gene Beijer, 9427 Haskell Ave., Sepulveda, Calif. 91343

[21] Appl. No.: 237,542

[22] Filed: Feb. 23, 1981

[51] Int. Cl.³ .............................................. F16B 21/18
[52] U.S. Cl. ................................ 411/353; 411/518
[58] Field of Search ........................ 411/517–519, 411/521–525, 533, 353, 531; 403/315, 316, 319, 326, DIG. 7

[56] References Cited

U.S. PATENT DOCUMENTS

| | | | |
|---|---|---|---|
| 320,392 | 6/1885 | Peterson et al. | 403/316 X |
| 581,139 | 4/1897 | Rhind | 403/326 X |
| 1,487,610 | 3/1924 | Schatzel | 411/533 |
| 2,304,155 | 12/1942 | Dyball | 411/533 |
| 2,730,381 | 1/1956 | Curtiss | 411/531 X |
| 2,862,040 | 11/1958 | Curran | 411/531 X |
| 2,895,754 | 7/1959 | Wurzel | 411/518 X |

FOREIGN PATENT DOCUMENTS

| | | | |
|---|---|---|---|
| 480881 | 8/1929 | Fed. Rep. of Germany | 411/523 |
| 1291167 | 3/1969 | Fed. Rep. of Germany | 403/326 |
| 2348903 | 4/1975 | Fed. Rep. of Germany | 411/531 |

Primary Examiner—Gary L. Smith
Assistant Examiner—Lloyd A. Gall

[57] ABSTRACT

A lock washer for use with spring type retainer rings such as snap rings, axially coiled springs, and the like, which are adapted to be mounted in a spring-retained holding position upon a shaft or other cylindrical member within a circumferentially extending groove or back of a retaining shoulder, but which may be deformed in a generally radially outward direction to a released position with respect to the groove or shoulder. The lock washer comprises an annular body portion which is adapted for axial face engagement mounting with an associated retainer ring, and is fabricated to provide a plurality of integral bendable peripheral tabs which are bendable over peripheral edge portions of the retainer ring to form radial holding abutments for opposing deformation of the retaining ring to a released position. The bent tabs also serve to axially secure the retaining ring and the associated lock washer against axial separation.

11 Claims, 6 Drawing Figures

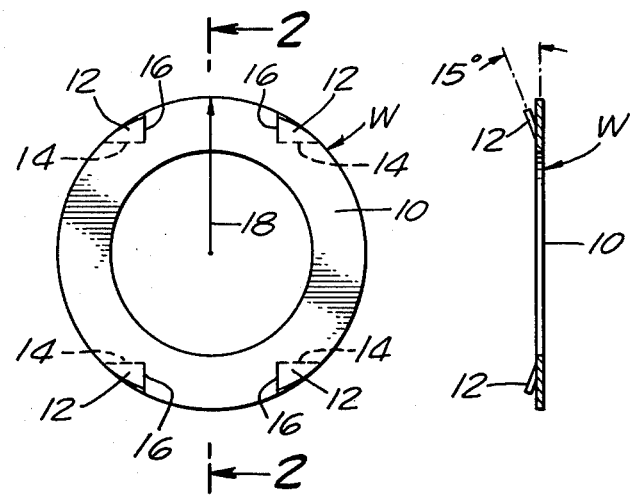
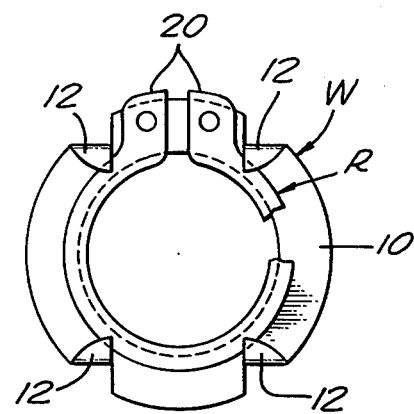
FIG.1.   FIG.2.   FIG.3.
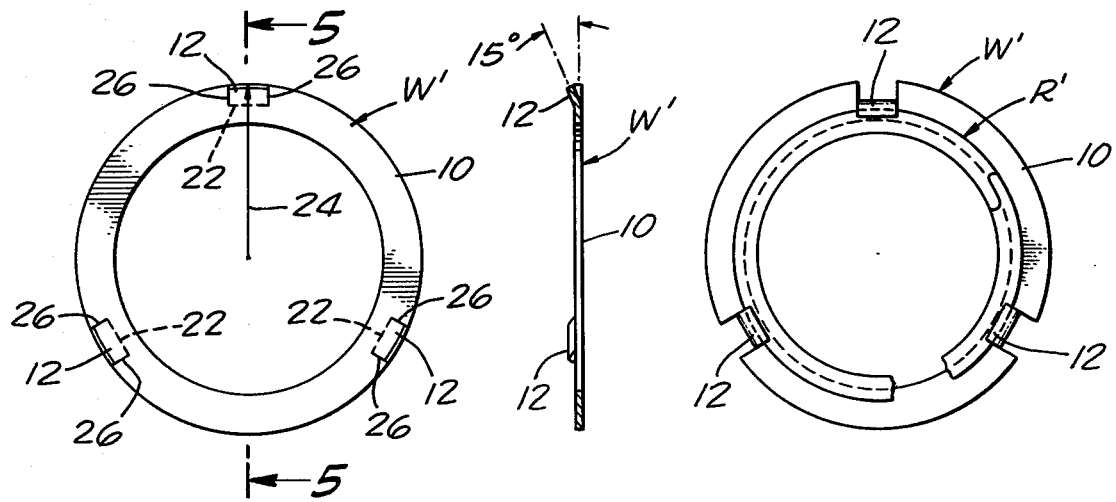
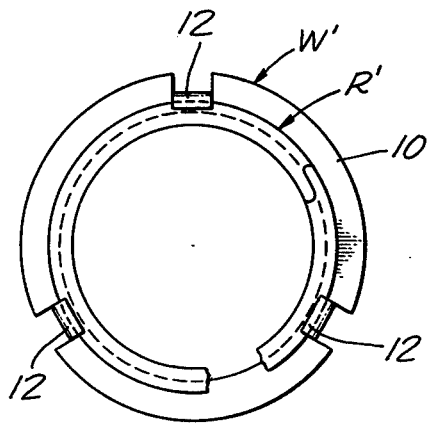
FIG.4.   FIG.5.   FIG.6.

LOCK WASHER FOR SPRING TYPE RETAINER RINGS

BACKGROUND OF THE INVENTION

The present invention relates generally to fastening devices.

It has become common practice in many segments of industry to utilize spring retainers such as snap rings, coiled spring rings and the like for releasably retaining cylindrical sleeves, pulleys, rotative elements and the like in an operating position on a supporting element such as a shaft or spindle. In the usual installation, the spring retainer is arranged to be spring seated in a peripheral groove or behind a peripheral shoulder so as to oppose axial removal of the retained part from the shaft, spindle or other support. However, removal of the retained part is readily accomplished by radially expanding the spring retainer in a manner to disengage it from its groove seated or shoulder abutting retaining position.

In many industrial applications, spring retainers as described above produce a simple and inexpensive type of fastener, which is utilized in great numbers. In certain areas of use, for example, in the aircraft industry where safety becomes a major factor of consideration, the need arises for some form of locking means which will effectively prevent the resilient retainer ring from inadvertently or accidentally becoming dislodged or disconnected from its normal holding or retaining position.

The present invention solves the problem and meets this need by providing a lock washer structure of unique construction, which is arranged for mounting in face engagement with and in axial alignment with the resilient retainer ring structure, the washer having a plurality of bendable tabs adapted to be bent over peripheral edges of the ring retainer in such a manner as to oppose releasing deformation spring retainer as well as to intimately connect the lock washer and ring retainer in a manner to oppose their axial separation.

SUMMARY OF THE INVENTION

The present invention relates particularly to lock washers, and is especially concerned with lock washers for use with spring type ring retainers such as snap rings, coiled springs, and the like.

It is one object of the herein described invention to provide a lock washer for a resilient retainer ring, which is simple, economical to produce and which, when mounted with the retainer, will effectively oppose movement of the resilient retainer out of its effective holding or retaining position.

A further object resides in the provision of a lock washer of unique construction for use with resilient type ring retainers, in which the lock washer has an annular body portion with integrally formed bendable tabs, these tabs being adapted to be bent over edge portions of the ring retainer so as to form peripheral abutments for opposing radial distortion of the retainer out of its effective retaining position.

It is also an object of the present invention to provide a lock washer according to the preceding object, in which the bendable tabs also serve to intimately secure the lock washer and ring retainer in axial relation, and thus hold the connected lock washer and retainer against axial separation.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a top plan view of one embodiment of a lock washer according to the present invention;

FIG. 2 is a transverse section taken substantially on line 2—2 of FIG. 1;

FIG. 3 is a top plan view of the washer of FIG. 1 and illustrating its operative association with a conventional snap ring;

FIG. 4 is a top plan view of a modified lock washer embodying the features of the present invention;

FIG. 5 is a transverse sectional view taken substantially on line 5—5 of FIG. 4; and FIG. 6 is a top plan view showing the manner in which the washer of FIG. 4 is operatively applied to a conventional retainer of the coiled spring type.

DESCRIPTION OF THE SEVERAL EMBODIMENTS OF THE INVENTION

Referring more specifically to the drawings, FIGS. 1 and 4 respectively disclose a lock washer W of one construction and a lock washer W' of a modified form of construction. These two embodiments are similar in that they comprise a flat annular body portion 10 which is in each case fabricated to provide a multiplicity of circumferentially spaced peripheral tabs 12.

The two embodiments of the lock washer, as generally indicated at W and W', differ primarily with respect to the circumferential positioning of the tabs 12 in order to adapt the washers respectively for operative association with different types of conventional resilient ring type retainers such as the conventionally known snap ring, as indicated at R in FIG. 3 or a conventional spiraled flat spring with overlapping end portions, as generally indicated at R' in FIG. 6.

Ring retainers of the snap ring and spiraled ring types are in practice utilized for retaining, for example, a cylindrical sleeve, pulley or other device on a shaft or cylindrical member. For such purpose, the retainer ring is adapted to seat within a groove or back of a shoulder, but may be deformed to remove the retainer ring from its unseated position, when desired to remove the member. The purpose of the lock washer as embodied in the present invention is to provide a means to prevent the inadvertent or accidental disengagement of the retaining ring, particularly in the case of parts which may be utilized in aircraft structures. That is to say, the lock washers provide a safety feature. The tabs 12 in both embodiments of the lock washer function in the same manner, and are bendable over peripheral portions of the resilient retainer so as to form, in effect, radial abutments for opposing movement of the resilient retainer to a deformed position in which it will be released. The tabs also secure the lock washer and retainer ring into intimate face engagement in which the lock washer and spring retainer will be retained against axial separation.

Referring more specifically to FIG. 1, it will be seen that each of the tabs 12 is fabricated to provide a line of bend 14 and a slit edge 16 which extends at right angles to the inner end of the bend line 14. The bend line and slit edge thus coact to provide a tab which is of generally triangular configuration. As viewed in FIG. 1, it will be seen that the tabs are arranged to provide upper and lower pairs of tabs. As thus arranged, the tabs 12 of the upper pair are positioned on opposite sides of a radius 18 and have their slit edges 16 in parallel confronting relation with respect to this radius. The tabs 12 of the lower pair are similarly arranged to those of the upper pair, but are in diametral relation thereto. Preferably each tab is initially bent at its bend line 14 to extend at an approximate angle of 15° to the plane of the ring, as shown in FIG. 2.

FIG. 3 illustrates the manner in which the lock washer W is applied to a snap ring R. It will be seen that in such case, the lock washer W and snap ring R are coaxially mounted in confronting face engagement, and by further bending of the tabs 12 over the peripheral edges of the snap ring, the lock washer and snap ring will be initimately secured against axial separation. Moreover, with the tabs of one of the pairs being positioned on opposite sides of the outwardly projecting arm portions 20 of the snap ring, the arms will be retained against separation which would permit release of the snap ring. It will be appreciated that the lock washer W. as utilized with a snap ring R, should be fabricated so that its inner and outer diameters respectively will be greater than the inner and outer diameters of the snap ring. As thus arranged, the tabs 12 of the lock washer will project beyond the periphery of the snap ring.

Referring now more specifically to FIG. 4, it will be seen that the circumferential arrangement of the tabs 12 is such that the tabs will be circumferentially spaced in 120° angular positions. In this embodiment, the tab 12 in each case is formed by a bend line 22 which is at right angles and symmetrical with respect to a radius as indicated at 24. In this case, however, the tab has two slit edges 26 respectively extending from the ends of the bend line 22 in parallel relation outwardly to the outer edge of the washer. As thus arranged, the tab will have a substantially rectangular configuration. As in the case the lock washer W, each tab 12 is deformed and bent at the bend line 22 to extend at an approximate angle of 15° to the plane of the washer, as best shown in FIG. 5.

The lock washer W' is operatively attached to the resilient ring retainer R' in a similar manner to that previously described for attaching the lock washer W to the ring retainer R. That is, by installing the washer and retainer in axial face engagement, and thereafter bending each of the tabs 12 over the peripheral edges of the retainer, as shown in FIG. 6. As in the case of the lock washer W, the lock washer W' similarly has inner and outer diameters which are respectively greater than the inner and outer diameters of the associated retainer R'. As thus attached, the lock washer W' functions in a similar manner to the lock washer W to prevent inadvertent or accidental deformation of the retainer ring R' from its seated holding position.

From the foregoing description, it is believed that it will be appreciated that the heretofore outlined objects of the invention will be attained and that the lock washer embodying the described features provides inherent advantages for retaining resilient retainer rings against detachment.

Various modifications may suggest themselves to those skilled in the art without departing from the spirit of the disclosed invention, and, hence, it is not wished to be restricted to the specific forms shown or uses mentioned, except to the extent indicated in the appended claims.

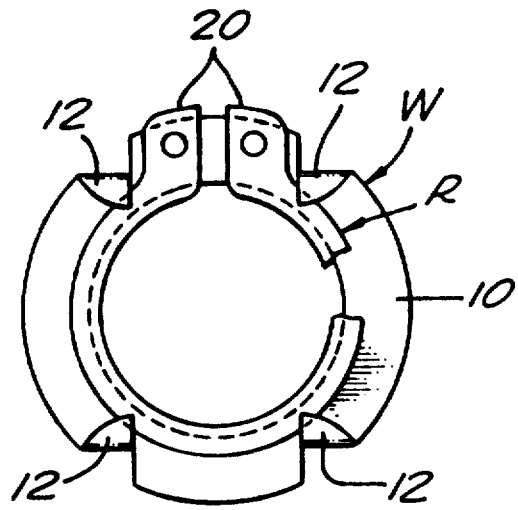

I claim:

1. A retainer assembly for mounting on a shaft in engagement with a circumferential shaft shoulder, comprising:
   a spring type retainer ring engageable with the shaft shoulder and being radially deformable to release it from engagement with said shoulder and from said shaft; and
   a lock washer having a generally flat annular body portion adapted to be coaxially positioned on said shaft in overlying engagement with one face of said retainer ring;
   said body portion being formed to provide a plurality of circumferentially spaced tab sets adapted, in the overlying position of the washer, to be bent over outer edge portions of the associated retainer ring and form abutments for opposing outward radial deformation of the retainer ring from its shoulder engagement position.

2. A retainer assembly according to claim 1, in which: said tab sets are bendable over adjacent edge portions of the associated retainer ring in a manner to hold the ring and washer against axial separation.

3. A retainer assembly according to claim 1, in which: said tab sets are integral with the body portion and have at least one line of bend and at least one slit edge intersecting the line of bend at a right angle.

4. A retainer assembly according to claim 3, in which: said tab sets are similarly pre-bent on said bend lines to angular positions respectively of substantially 15 degrees.

5. A retainer assembly according to claim 3, in which: tabs of said tab sets are adjacently positioned in spaced relation on opposite sides of a radius of the annular body, and with their slit edges in confronting parallel relation.

6. A retainer assembly according to claim 5, in which: said retainer is of the snap ring type with a pair of adjacent outwardly projecting arm portions which are separable to releasably remove the retainer from said shaft, and
   said tab sets are respectively positioned on opposite sides of said arm portions to oppose separation of said arm portions.

7. A retainer assembly according to claim 1, in which: said annular body portion has an inner diameter that is greater than the inner diameter of the associated retainer ring.

8. A retainer assembly according to claim 1, in which: said annular body portion has an outer diameter greater than the outer diameter of the associated retainer ring.

9. A retainer assembly according to claim 8, in which: said tab sets are inwardly of the outer periphery of the washer and project beyond the outer periphery of the associated retainer ring.

10. A lock washer for a spring type retainer ring engageable with a circumferential shaft shoulder, said retainer ring being radially deformable to release it from engagement with said shoulder and said shaft, and in which:
   said washer comprises a generally flat annular body portion adapted to be coaxially positioned in overlying engagement with one face of said retainer;
   said body is formed to provide a plurality of circumferentially spaced tabs adapted to be bent over outer edge portions of the associated retainer ring, in the overlying position of the washer, to form abutments for opposing outward radial deformation of the retainer ring from its shoulder engagement position;

said tabs are integral with the body portion and have at least one line of bend, and at least one slit edge intersecting the line of bend at a right angle;

a set of two of said tabs are adjacently positioned in spaced relation on opposite sides of a radius of the annular body with their slit edges in confronting parallel relation, and another set of tabs comprises two similar tabs positioned in diametral relation on said annular body.

11. A lock washer for a shoulder engaging spring type retainer ring, said retainer ring being radially deformable to release it from engagement with said shoulder, and in which:

said retainer is of the snap ring type with a pair of adjacent outwardly projecting arm portions which are separable to releasably remove the retainer;

said washer comprises a generally flat annular body portion adapted to be coaxially positioned in overlying engagement with one face of said retainer;

said body is formed to provide a plurality of circumferentially spaced tabs adapted to be bent over outer edge portions of the associated retainer ring in the overlying position of the washer, to form abutments for opposing outward radial deformation of the retainer ring from its shoulder engagement position;

said tabs are integral with the body portion and have at least one line of bend, and at least one slit edge intersecting the line of bend at a right angle; and said tabs being arranged to provide a plurality of sets of tabs that are selectively positionable in operative relation to said arm portions of the retainer, and with two tabs of one of said tab sets being adjacently positioned in spaced relation on opposite sides of a radius of the annular body, and with their slit edges in confronting parallel relation respectively on opposite sides of said arm portions to oppose their separation.

* * * * *

UNITED STATES PATENT AND TRADEMARK OFFICE
CERTIFICATE OF CORRECTION

PATENT NO. : 4,459,119  
DATED : July 10, 1984  
INVENTOR(S) : Gene Beijer

Page 1 of 2

It is certified that error appears in the above-identified patent and that said Letters Patent is hereby corrected as shown below:

The title page should be deleted to appear as per attached title page.

Signed and Sealed this

Twenty-third Day of October 1984

[SEAL]

Attest:

Attesting Officer

GERALD J. MOSSINGHOFF

Commissioner of Patents and Trademarks

United States Patent [19]

Beijer

[11] Patent Number: 4,459,119
[45] Date of Patent: Jul. 10, 1984

[54] LOCK WASHER FOR SPRING TYPE RETAINER RINGS

[76] Inventor: Gene Beijer, 9427 Haskell Ave., Sepulveda, Calif. 91343

[21] Appl. No.: 237,542

[22] Filed: Feb. 23, 1981

[51] Int. Cl.³ .............................................. F16B 21/18
[52] U.S. Cl. .................................... 411/353; 411/518
[58] Field of Search .............................. 411/517-519, 411/521-525, 533, 353, 531; 403/315, 316, 319, 326, DIG. 7

[56] References Cited

U.S. PATENT DOCUMENTS

| | | | |
|---|---|---|---|
| 320,392 | 6/1885 | Peterson et al. | 403/316 X |
| 581,139 | 4/1897 | Rhind | 403/326 X |
| 1,487,610 | 3/1924 | Schatzel | 411/533 |
| 2,304,155 | 12/1942 | Dyball | 411/533 |
| 2,730,381 | 1/1956 | Curtiss | 411/531 X |
| 2,862,040 | 11/1958 | Curran | 411/531 X |
| 2,895,754 | 7/1959 | Wurzel | 411/518 X |

FOREIGN PATENT DOCUMENTS

| | | | |
|---|---|---|---|
| 480881 | 8/1929 | Fed. Rep. of Germany | 411/523 |
| 1291167 | 3/1969 | Fed. Rep. of Germany | 403/326 |
| 2348903 | 4/1975 | Fed. Rep. of Germany | 411/531 |

Primary Examiner—Gary L. Smith
Assistant Examiner—Lloyd A. Gall

[57] ABSTRACT

A lock washer for use with spring type retainer rings such as snap rings, axially coiled springs, and the like, which are adapted to be mounted in a spring-retained holding position upon a shaft or other cylindrical member within a circumferentially extending groove or back of a retaining shoulder, but which may be deformed in a generally radially outward direction to a released position with respect to the groove or shoulder. The lock washer comprises an annular body portion which is adapted for axial face engagement mounting with an associated retainer ring, and is fabricated to provide a plurality of integral bendable peripheral tabs which are bendable over peripheral edge portions of the retainer ring to form radial holding abutments for opposing deformation of the retaining ring to a released position. The bent tabs also serve to axially secure the retaining ring and the associated lock washer against axial separation.

11 Claims, 6 Drawing Figures